US011233435B2

(12) United States Patent
Yoon et al.

(10) Patent No.: US 11,233,435 B2
(45) Date of Patent: Jan. 25, 2022

(54) METHOD FOR WEAVING WIRES FOR AN ELECTRIC MACHINE

(71) Applicant: BorgWarner Inc., Auburn Hills, MI (US)

(72) Inventors: Suk-Chun Yoon, Gyeongsangnam-do (KR); Seyun Kim, Daegu (KR)

(73) Assignee: BORGWARNER INC., Auburn Hills, MI (US)

( * ) Notice: Subject to any disclaimer, the term of this patent is extended or adjusted under 35 U.S.C. 154(b) by 348 days.

(21) Appl. No.: 16/537,041

(22) Filed: Aug. 9, 2019

(65) Prior Publication Data

US 2020/0052537 A1   Feb. 13, 2020

Related U.S. Application Data

(60) Provisional application No. 62/717,692, filed on Aug. 10, 2018.

(51) Int. Cl.
*H02K 3/28* (2006.01)
*H02K 15/04* (2006.01)

(52) U.S. Cl.
CPC .......... *H02K 3/28* (2013.01); *H02K 15/0435* (2013.01); *H02K 15/0464* (2013.01); *Y10T 29/49009* (2015.01)

(58) Field of Classification Search
CPC ...... H02K 3/28; H02K 15/0056; H02K 15/04; H02K 15/0435; H02K 15/0464; H02K 15/0478; H02K 15/0485; Y10T 29/49009
See application file for complete search history.

(56) References Cited

U.S. PATENT DOCUMENTS

| 6,901,649 B2 | 6/2005 | Imori et al. |
| 7,269,888 B2* | 9/2007 | Neet ......................... H02K 3/12 29/596 |

(Continued)

FOREIGN PATENT DOCUMENTS

| CN | 106787337 A | 5/2017 |
| JP | H1198786 A | 4/1999 |

(Continued)

OTHER PUBLICATIONS

International Search Report and Written Opinion for International Applciation No. PCT/US2019/045949; International Filing Date Aug. 9, 2019; Report dated Nov. 28, 2019 (pp. 1-9).

(Continued)

*Primary Examiner* — Peter Dungba Vo
*Assistant Examiner* — Joshua D Anderson
(74) *Attorney, Agent, or Firm* — Cantor Colburn LLP

(57) ABSTRACT

A method of forming a stator winding including forming a first conductor having a first end, a second end, and a first plurality of end turns therebetween, the plurality of end turns having at least a first winding pitch, forming a second conductor having a first end portion, a second end portion, and a second plurality of end turns therebetween, the plurality of end turns having at least the first winding pitch, bending a first section of the first conductor at a select one of the plurality of end turns, overlaying the second conductor onto a second section of the first conductor, and unbending the first section of the first conductor such that a first portion of the second conductor is below the first section of the first conductor and a second portion of the second conductor is atop the second section of the first conductor forming a first conductor pair.

17 Claims, 16 Drawing Sheets

(56) References Cited

U.S. PATENT DOCUMENTS

| | | |
|---|---|---|
| 7,703,192 B2 | 4/2010 | Sadiku et al. |
| 7,952,245 B2 | 5/2011 | Ueda et al. |
| 8,832,928 B2 * | 9/2014 | Akimoto ............ H02K 15/0478 29/605 |
| 2006/0163959 A1 | 7/2006 | Ogawa et al. |
| 2009/0320275 A1 * | 12/2009 | Dobashi ............. H02K 15/0478 29/596 |
| 2010/0231082 A1 | 9/2010 | Bodin et al. |
| 2014/0042865 A1 | 2/2014 | Mourou et al. |
| 2014/0252908 A1 | 9/2014 | Sadiku et al. |
| 2014/0354095 A1 | 12/2014 | Ishikawa et al. |
| 2015/0054374 A1 | 2/2015 | Neet |
| 2017/0229936 A1 | 8/2017 | Kang et al. |
| 2020/0028417 A1 | 1/2020 | Neet et al. |
| 2020/0052561 A1 | 2/2020 | Neet |
| 2020/0052562 A1 | 2/2020 | Neet |

FOREIGN PATENT DOCUMENTS

| | | |
|---|---|---|
| JP | 2004023808 A1 | 1/2004 |
| JP | 2009148147 A | 7/2009 |

OTHER PUBLICATIONS

International Search Report and Written Opinion for International Application No. PCT/US2019/045947; International Filing Date Aug. 9, 2019; Report dated Nov. 28, 2019 (pp. 1-8).

International Search Report and Written Opinion for International Application No. PCT/US2019/045967; International Filing Date Aug. 9, 2019; Report dated Dec. 5, 2019 (pp. 1-8).

International Search Report and Written Opinion for International Application No. PCT/US2019/016243; International Filing Date Feb. 1, 2019; Report dated May 17, 2019 (pp. 1-8).

* cited by examiner

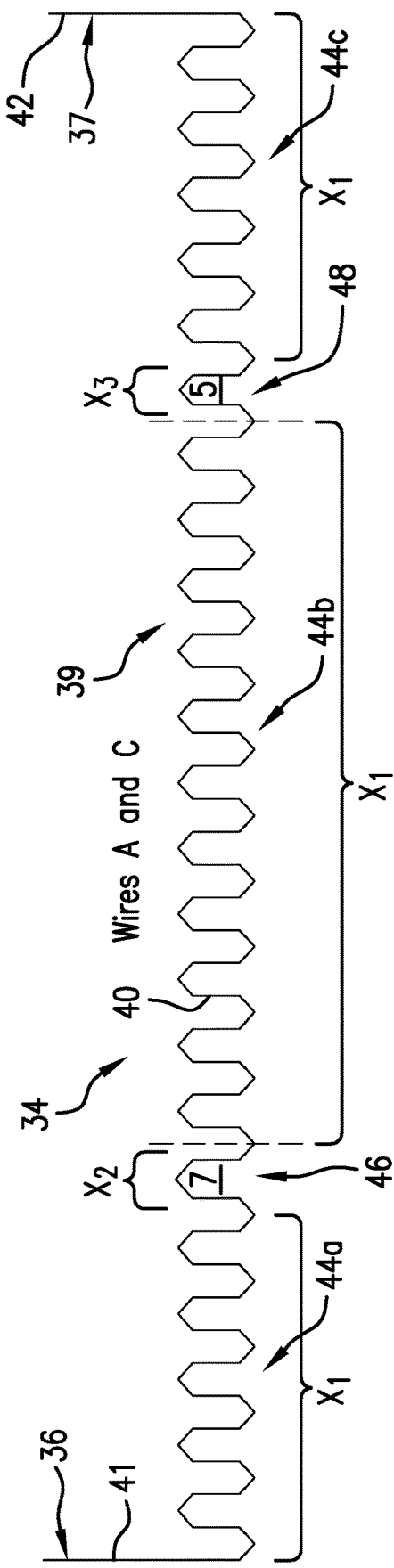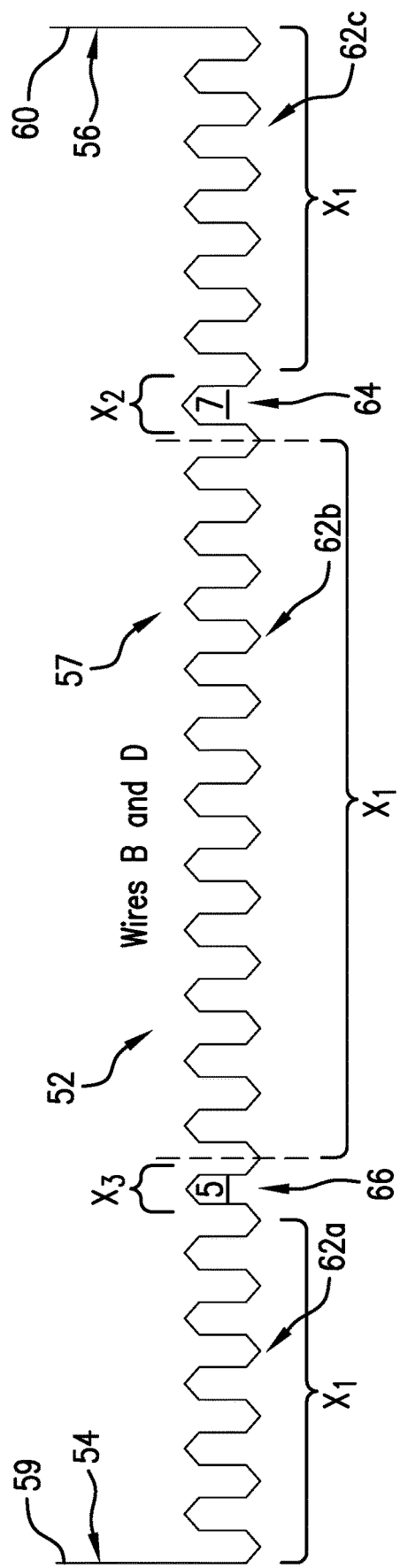

METHOD FOR WEAVING WIRES FOR AN ELECTRIC MACHINE

CROSS-REFERENCE TO RELATED APPLICATIONS

This application claims the benefit of an earlier filing date from U.S. Provisional Application No. 62/717,692 filed Aug. 10, 2018, the entire disclosure of which is incorporated herein by reference.

BACKGROUND

The stator of an electrical motor or generator includes two parts and insulation material. The first part is the lamination. A lamination is typically formed of laminated sheets of electrical steel that is formed (stamped, rolled or bent) into an annulus shape having an ID, an OD and a stack height. The lamination further includes slots open to the ID or OD. The slots have a width and a depth. In between each slot is a lamination tooth that extends from the ID or OD lamination back iron (yoke).

The second part is the winding. The winding is typically formed of insulated copper wire. It should be understood however, other conductive materials, such as aluminum, might be used. The winding includes a number of phases—typically 3, 5 or 6. The number of phases may vary. For each phase, the winding includes conductors having slot segments and end loops. The slot segments are housed in the lamination slots. The end loops span mostly circumferentially and connect two slot segments together. The winding may be a delta winding or a wye winding.

A distributed winding is a winding that has poles of one phase that include more than one slot, typically adjacent slots. Each phase may also occupy multiple winding layers. For example, in a 3 phase winding, there may be 24 poles, with two slots being occupied by each pole and the winding may occupy 8 winding layers. Each pole may span three slots, but only occupy two slots at a time in any given winding layer. The winding should be electrically balanced in order to minimize losses and increase efficiency. Creating an electrically balanced winding that may be introduced into more compact stators is a challenge. Accordingly, the industry would be receptive of a system that forms a balanced stator winding that has a reduced thickness and which may be incorporated into more compact stator cores.

SUMMARY

Disclosed is a method of forming a stator winding including forming a first conductor having a first end, a second end, and a first plurality of end turns therebetween, the plurality of end turns having at least a first winding pitch, forming a second conductor having a first end portion, a second end portion, and a second plurality of end turns therebetween, the plurality of end turns having at least the first winding pitch, bending a first section of the first conductor at a select one of the plurality of end turns, overlaying the second conductor onto a second section of the first conductor, and unbending the first section of the first conductor such that a first portion of the second conductor is below the first section of the first conductor and a second portion of the second conductor is atop the second section of the first conductor forming a first conductor pair.

Also disclosed is a method of forming a stator winding including forming a plurality of conductors having a first end, a second end, and a first plurality of end turns therebetween, the plurality of end turns having at least a first winding pitch, forming a first plurality of conductors into a first conductor winding having a first longitudinal axis, forming a second plurality of conductors into a second conductor winding having a second longitudinal axis, bending the first conductor winding forming a first segment and a second segment, overlaying the second conductor winding on the first conductor winding, and unbending the first conductor winding such that the first segment is on top of the second conductor winding and the second segment is below the second conductor winding, forming a combined conductor winding.

BRIEF DESCRIPTION OF THE DRAWINGS

The following descriptions should not be considered limiting in any way. With reference to the accompanying drawings, like elements are numbered alike:

FIG. 2 depicts a conductor of the winding of the stator of FIG. 1, in accordance with an aspect of an exemplary embodiment;

FIG. 3 depicts another winding of the stator of FIG. 1, in accordance with an aspect of an exemplary embodiment;

DETAILED DESCRIPTION

A detailed description of one or more embodiments of the disclosed apparatus and method are presented herein by way of exemplification and not limitation with reference to the Figures.

Figure 1:
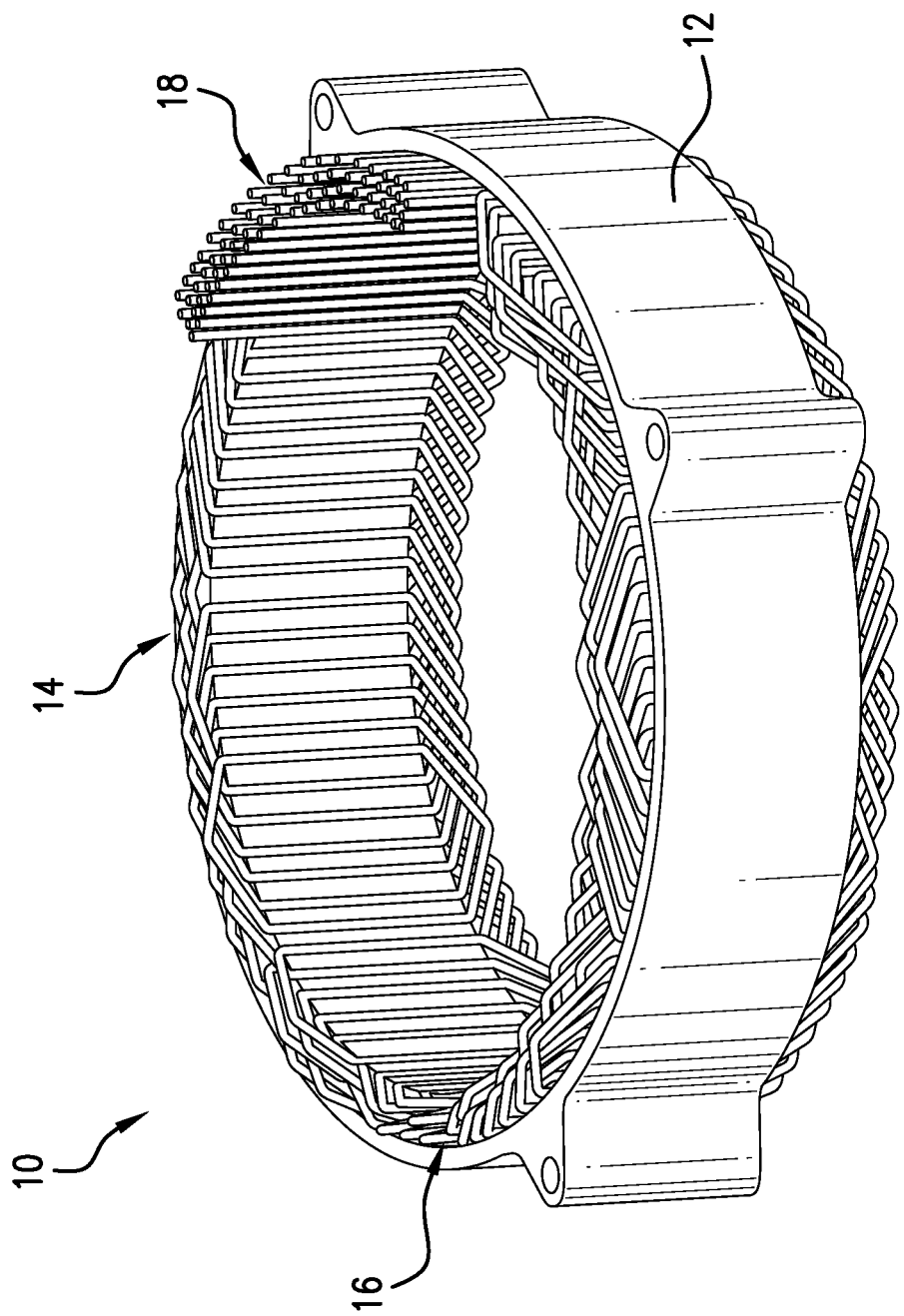
FIG. 1 depicts a stator for an electric motor including a winding, formed in accordance with an aspect of an exemplary embodiment.

A stator for an electric machine is indicated generally at 10 in FIG. 1. Stator 10 includes a stator body 12 that supports a plurality of windings 14. Stator body 12 may be formed from an electrically conductive material and includes a plurality of slots (not shown) which, in the embodiment shown, are formed in an inner annular surface (also not shown). Windings 14 include a woven section 16 and a connector lead section 18. Woven section 16 defines a portion of winding 14 at which point conductors may be interlaced to establish a desired form factor and electrical balance. Connector lead section 18 defines a portion at terminal ends of the conductors forming winding 14 may be interconnected and coupled to, for example, a power source.

Winding 14 is formed by creating woven conductor pairs of AB conductors and B/D conductors. As will become apparent herein, a B conductor may represent a mirror image of an A conductor and a D conductor may represent a mirror image of a C conductor, with the A and C conductors being substantially identical and the B and D conductors being substantially identical. Referring to FIG. 2, a first conductor 34 is shown to include a first end 36, a second end 37, a plurality of end turns 39 joining a plurality of slot segments, one of which is shown at 40, extending therebetween. First conductor 34 may represent either an A conductor or a C conductor depending upon position.

First end 36 of first conductor 34 defines a first connector lead 41 and second end 37 defines a second connector lead 42. Plurality of end turns 39 include a first plurality of bends 44A having a first winding pitch X1, a second plurality of bends 44B having the first winding pitch X1, and a third plurality of bends 44C having the first winding pitch X1. Plurality of end turns 39 also include a bend 46 having a second winding pitch X2 and a bend 48 having a third winding pitch X3. Second winding pitch X2 may be one greater than first winding pitch X1 and third winding pitch X3 may be one less than first winding pitch X1. In an embodiment, first winding pitch X1 may represent a 6 pitch, second winding pitch X2 may represent a 7 pitch, and third winding pitch X3 may represent a 5 pitch. The particular pitch value may vary. The phrase 6 pitch describes that a particular end loop connects two slot segments that span over 5 slots.

Figure 4:
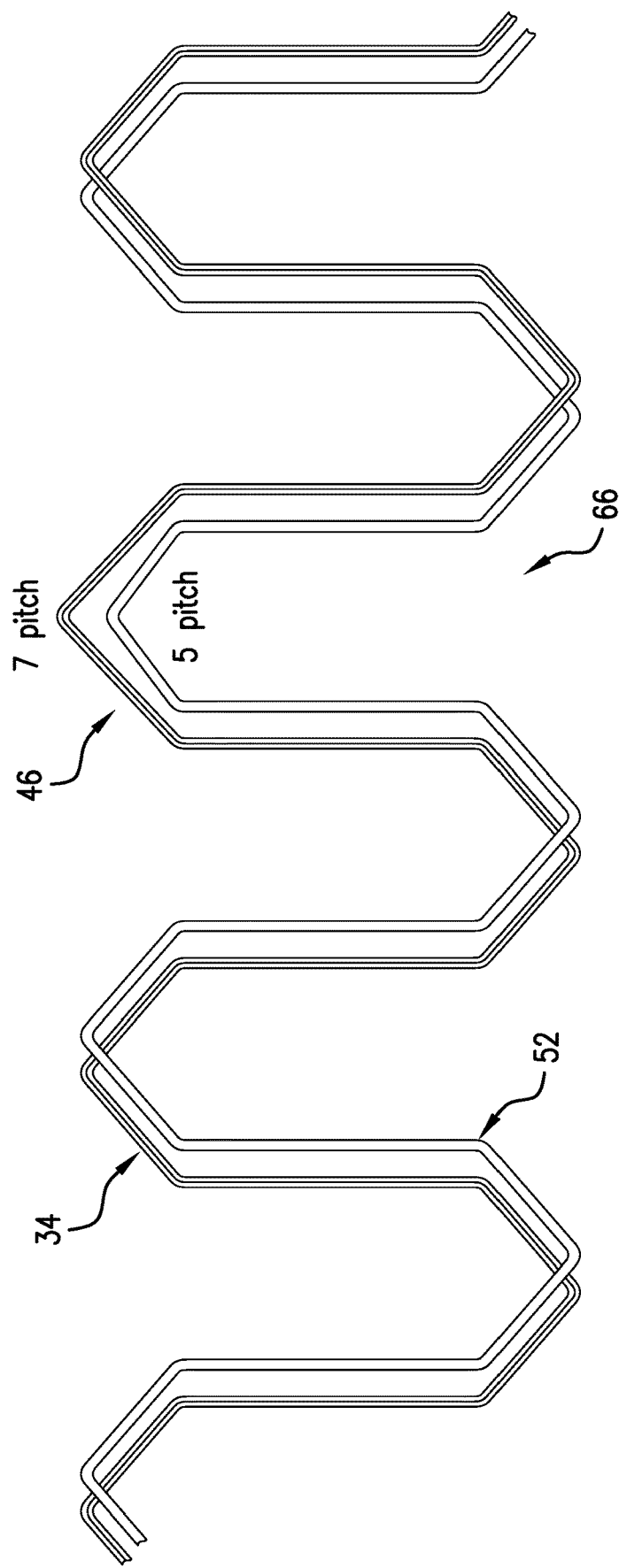
FIG. 4 depicts a portion of the winding and a portion of the another winding woven together, in accordance with an aspect of an exemplary embodiment.

Referring to FIG. 3, a second conductor 52 is shown to include a first end portion 54, a second end portion 56, and a plurality of end turns 57 extending therebetween. First end portion 54 of second conductor 52 defines a first connector lead 59 and second end portion 56 defines a second connector lead 60. Plurality of end turns 57 include a first plurality of bends 62A having the first winding pitch X1, a second plurality of bends 62B having the first winding pitchy X1, and a third plurality of bends 62C having the first winding pitch X1. Plurality of end turns 57 also include a bend 64 having the second winding pitch X2 and a bend 66 having the third winding pitch X3. As will be detailed herein, bend 66 of second conductor 52 is positioned so as to within bend 46 of first conductor 34 as shown in FIG. 4. With this arrangement, a relative position of first and second conductors 34 and 52 may change one or more times between first ends 36 and 54 and second end 37 and 55.

Figure 5:
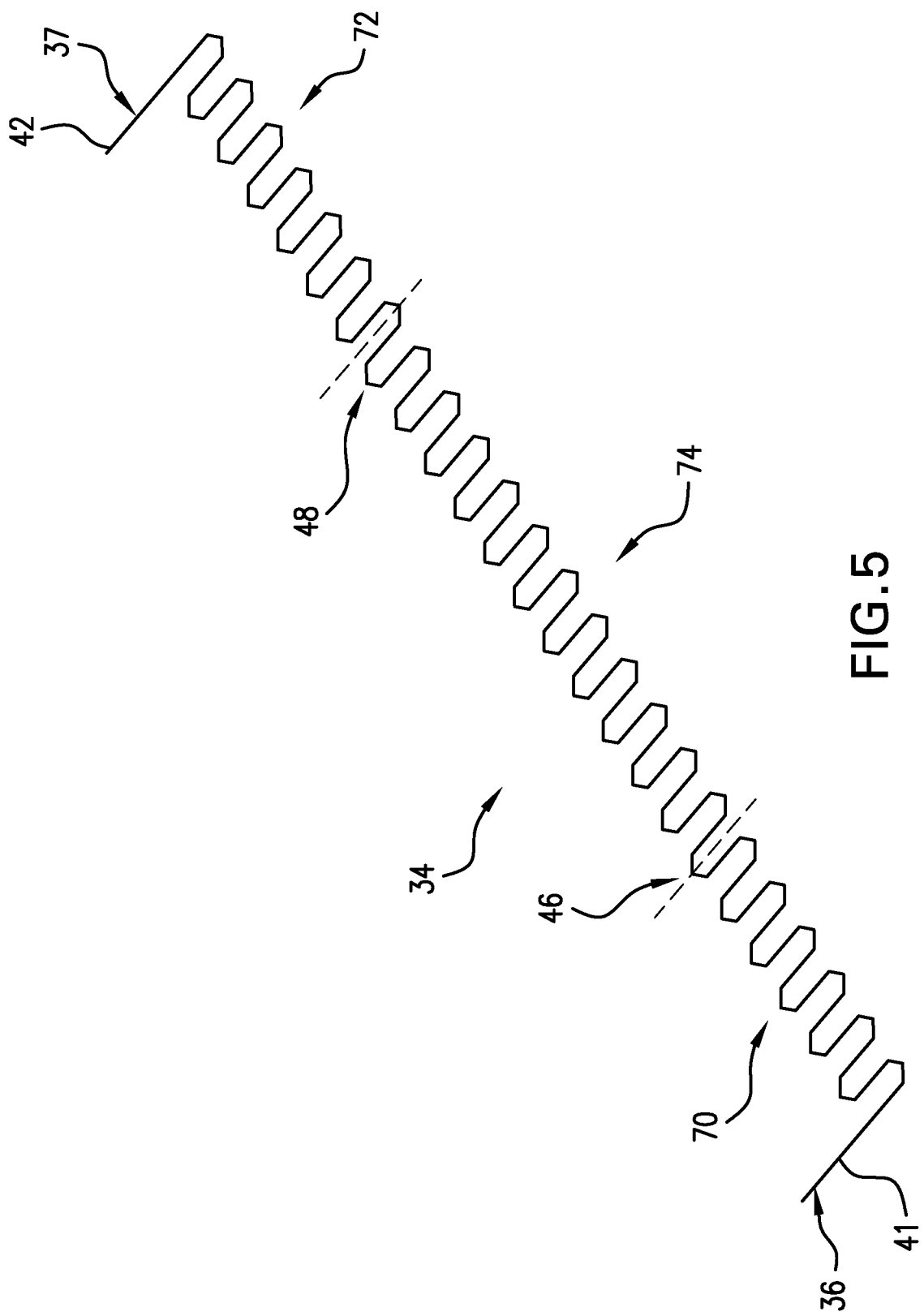
FIG. 5 depicts the winding of FIG. 2 preparing for a weaving operation, in accordance with an aspect of an exemplary embodiment.
Figure 6:
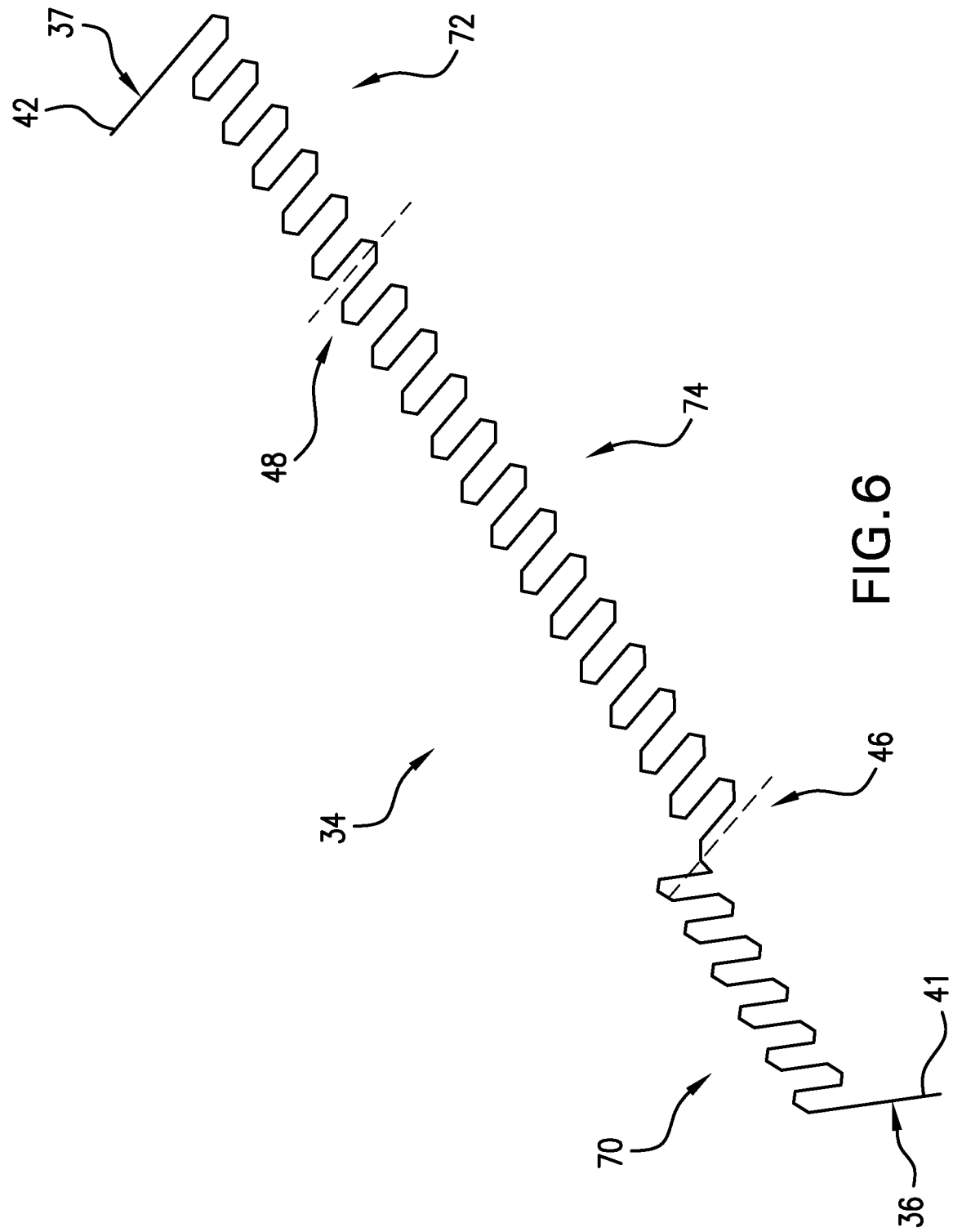
FIG. 6 depicts a first portion of the winding of FIG. 5 folded in a first direction, in accordance with an aspect of an exemplary embodiment.
Figure 7:
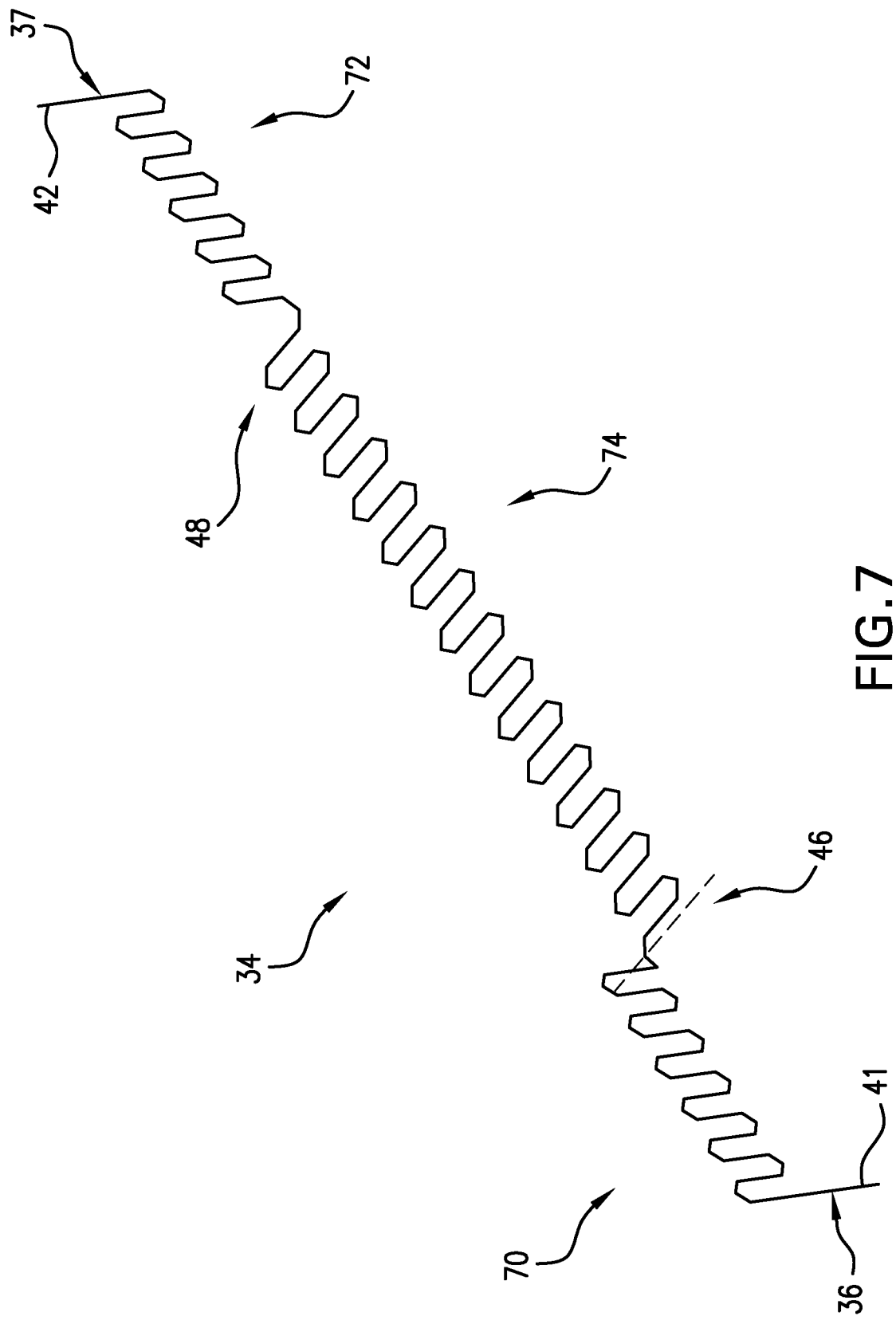
FIG. 7 depicts a second portion of the winding of FIG. 6 folded in the first direction, in accordance with an aspect of an exemplary embodiment.

Referring to FIGS. 5-7, first conductor 34 may be positioned and manipulated to prepare for acceptance of second conductor 52. As an example, first conductor 34 may be bent upwards at bend 46 or at an end turn 39 adjacent to bend 46, in a first direction forming a first section 70 defined between first end 36 and either bend 46 or one of plurality of end turns 39 adjacent to bend 46 as shown in FIG. 6. First conductor 34 may also be bent upwards but in a second direction to form a second section 72 defined between second end 37 and one of plurality of end turns 39 adjacent to bend 48 as shown in FIG. 7. The first direction is shown opposite in FIG. 7 in that the first section 70 is bent upwards in a counter-clockwise direction and the second section 72 is bent upwards in a clockwise direction. However, it should be understood that the first section 70 and second section 72 could be bent upwards in the same rotational direction. A third section 74 may be defined between another one of plurality of end turns 39 adjacent to bend 46 and yet another one of plurality of end turns 39 adjacent to bend 48.

Figure 8:
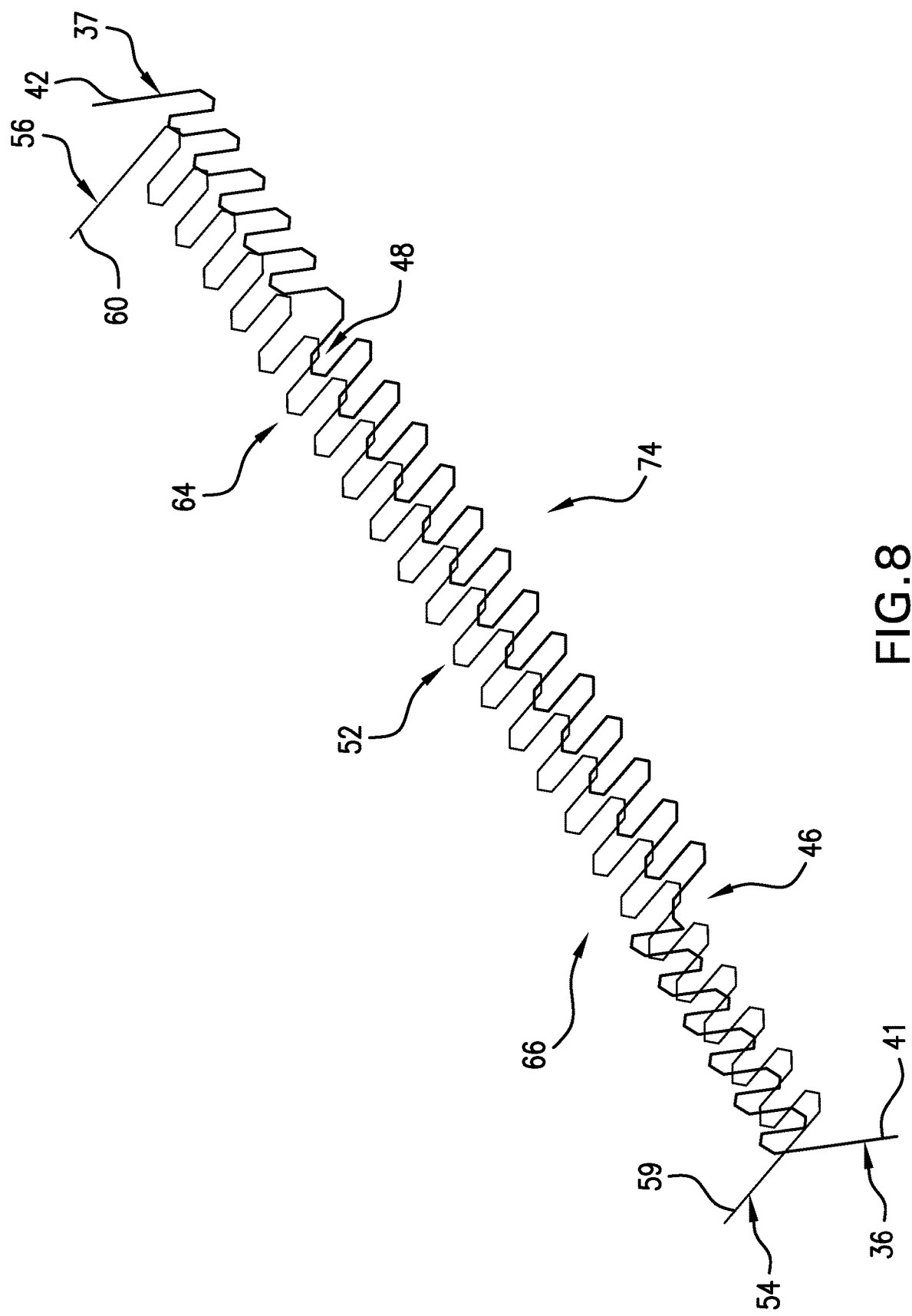
FIG. 8 depicts the another winding of FIG. 3 overlaid onto the winding of FIG. 7, in accordance with an aspect of an exemplary embodiment.
Figure 9:
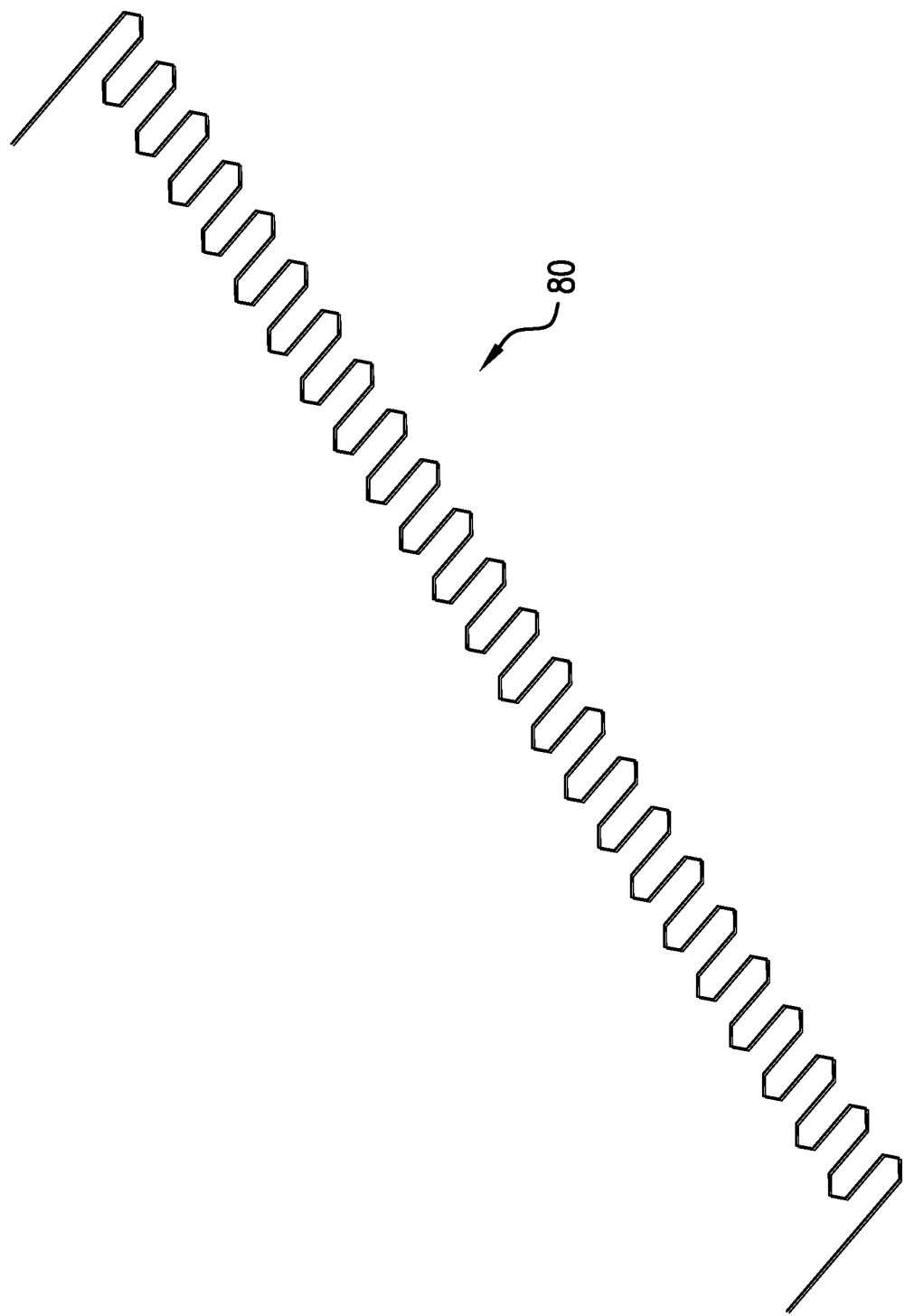
FIG. 9 depicts the first and second portions of the winding of FIG. 8 unfolded onto the another winding forming a first conductor pair, in accordance with an aspect of an exemplary embodiment.

At this point, second conductor 52 may be overlaid onto first conductor 34 as shown in FIGS. 8 9. FIG. 8 shows second conductor 52 in process of being overlaid onto the first conductor 34. First section 70 and second section 72 may be unfolded. At this point, first and second portions of second conductor 52 (not separate labeled) lie below first section 70 and a third portion of second conductor 52 lies atop third section 74 forming a first conductor pair 80 for carrying a first electrical phase as shown in FIG. 9. First conductor pair 80 are formed as woven A and B conductors. At this point it should be understood that the terms "below" and "atop" should be understood to be presented for clarity and are not intended to impose any limitations on the positions of first and second conductors 34 and 52.

Figure 10:
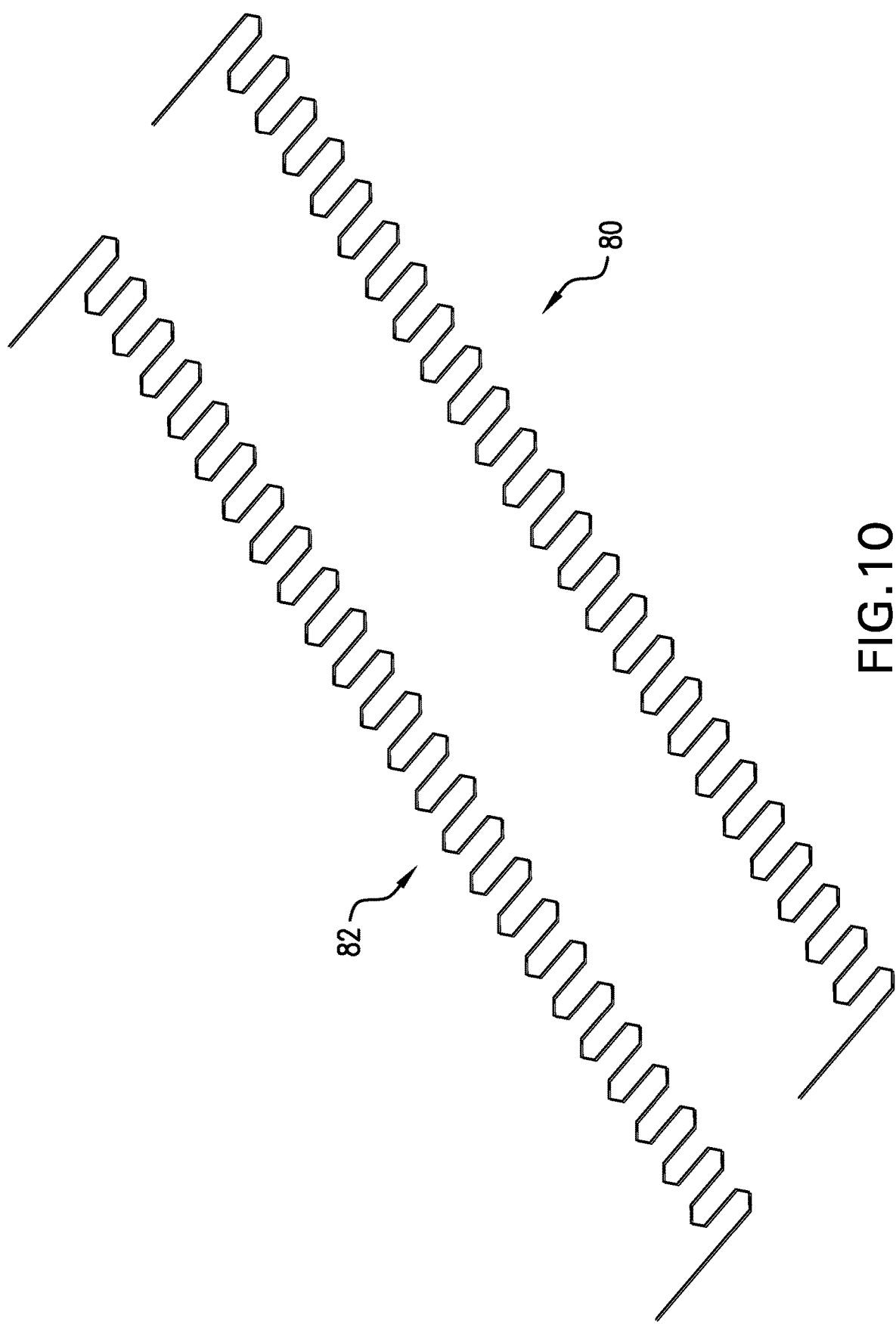
FIG. 10 depicts a second conductor pair being overlaid onto the first conductor pair, in accordance with an aspect of an exemplary embodiment.
Figure 11:
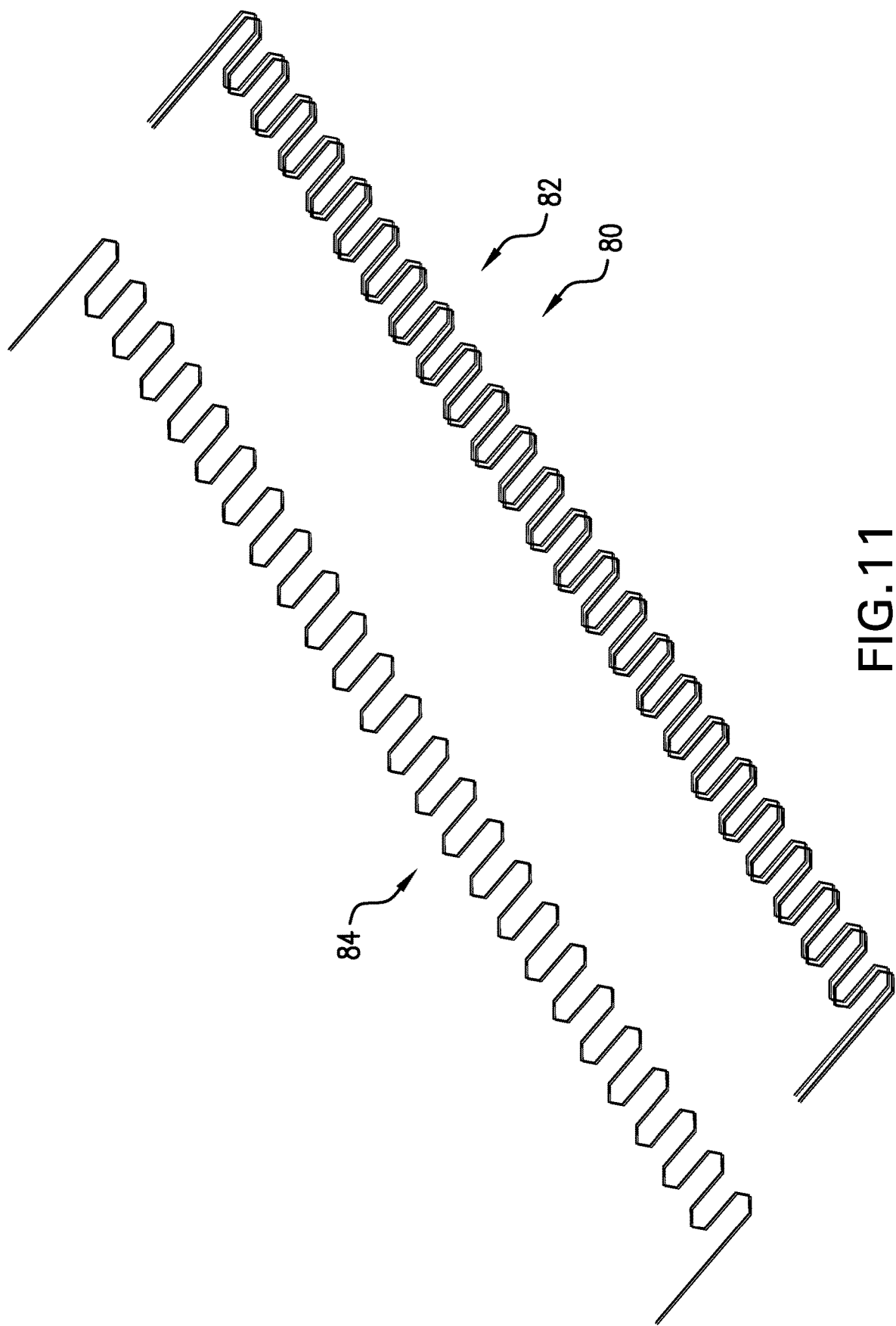
FIG. 11 depicts a third conductor pair being overlaid onto the first and second conductor pairs, in accordance with an aspect of an exemplary embodiment.
Figure 12:
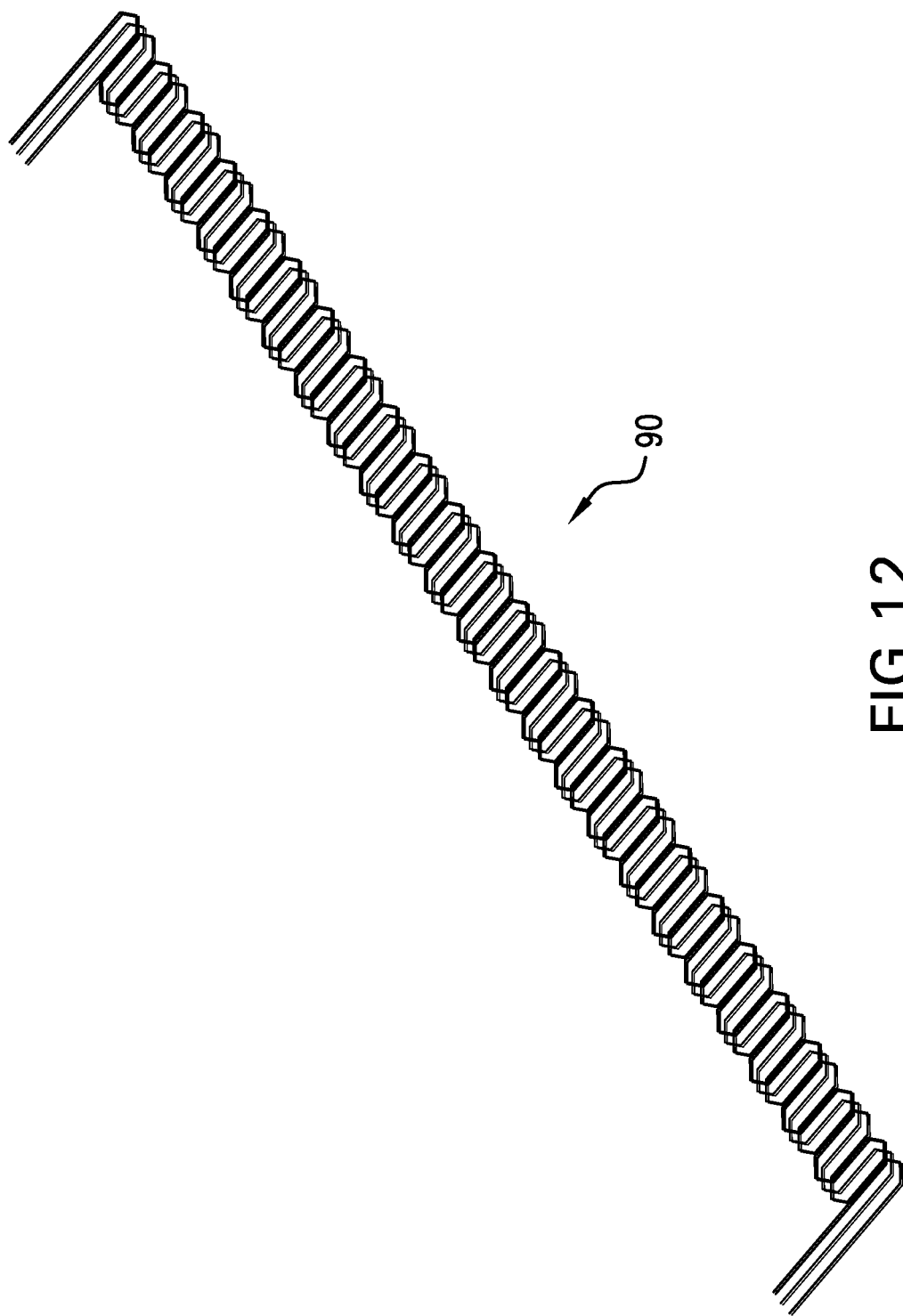
FIG. 12 depicts a first six conductor winding including the first, second, and third conductor pairs, in accordance with an aspect of an exemplary embodiment.

In accordance with an exemplary aspect, a second conductor pair 82, formed in a manner substantially similar to first conductor pair 80 is formed as shown in FIG. 10. Second conductor pair 82 is placed atop first conductor pair 80. In still further accordance with an exemplary aspect, a third conductor pair 84 is formed in a manner substantially similar to first conductor pair 80 and second conductor pair 82 as shown in FIG. 11. Third conductor pair 84 is placed atop first conductor pair 80 and second conductor pair 82 to form a first six conductor winding 90 as shown in FIG. 12. At this point, it should be understood that first six conductor winding 90 is formed by overlaying three two conductor pairs of AB conductors.

Figure 13:
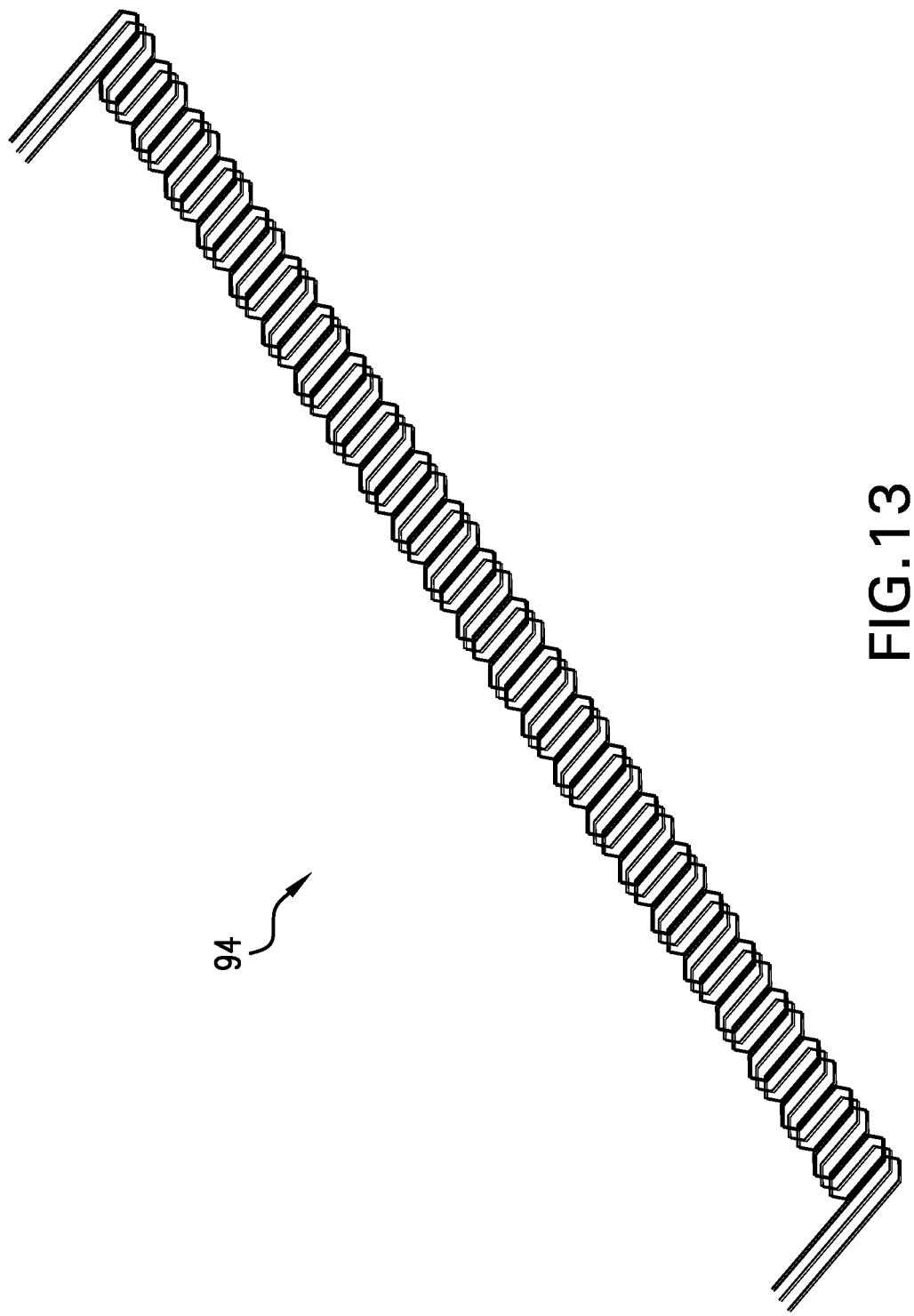
FIG. 13 depicts a second six conductor pair, formed in accordance with an aspect of an exemplary embodiment.
Figure 14:
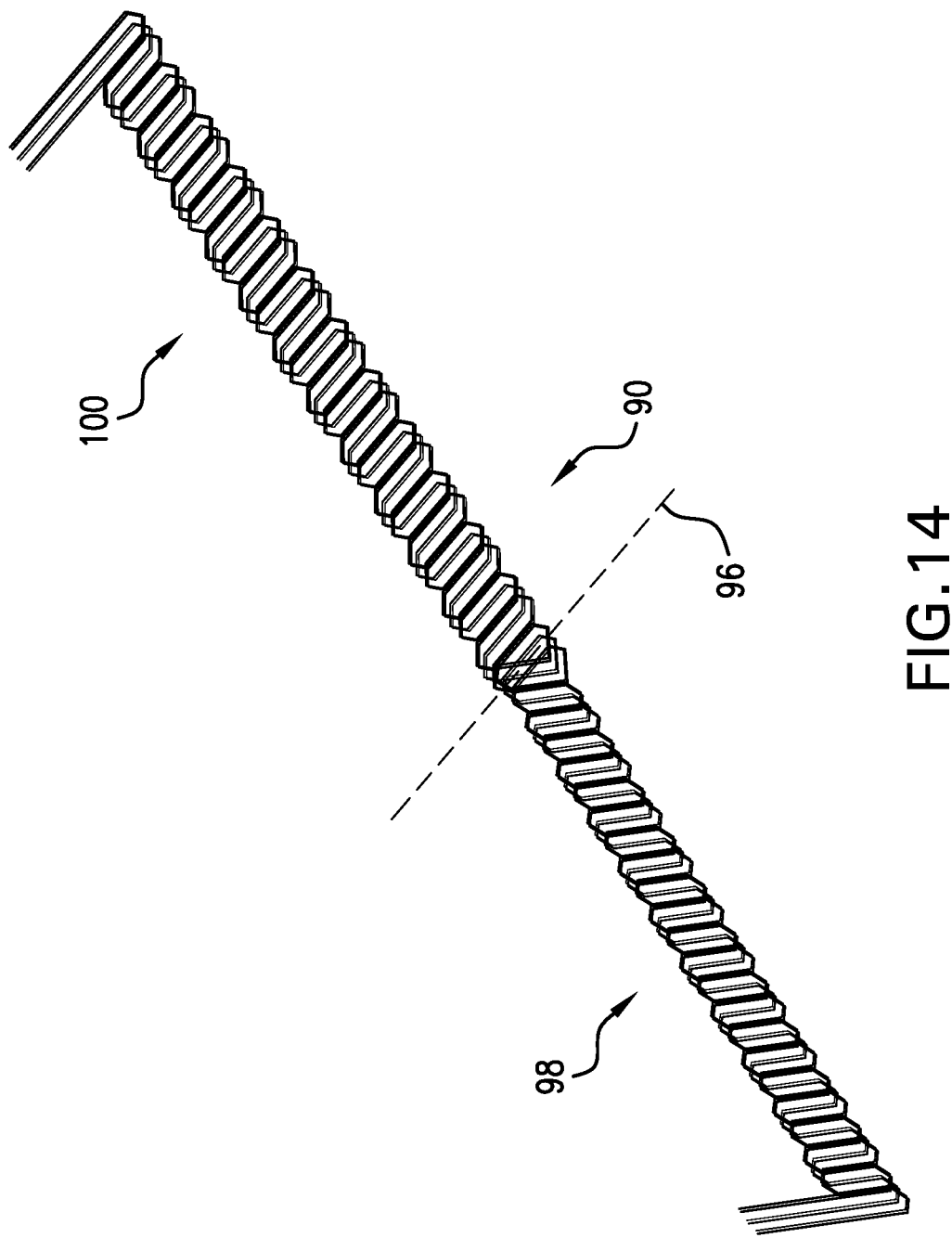
FIG. 14 first portion of the first six conductor winding rotating about an axis, in accordance with an aspect of an exemplary embodiment.
Figure 15:
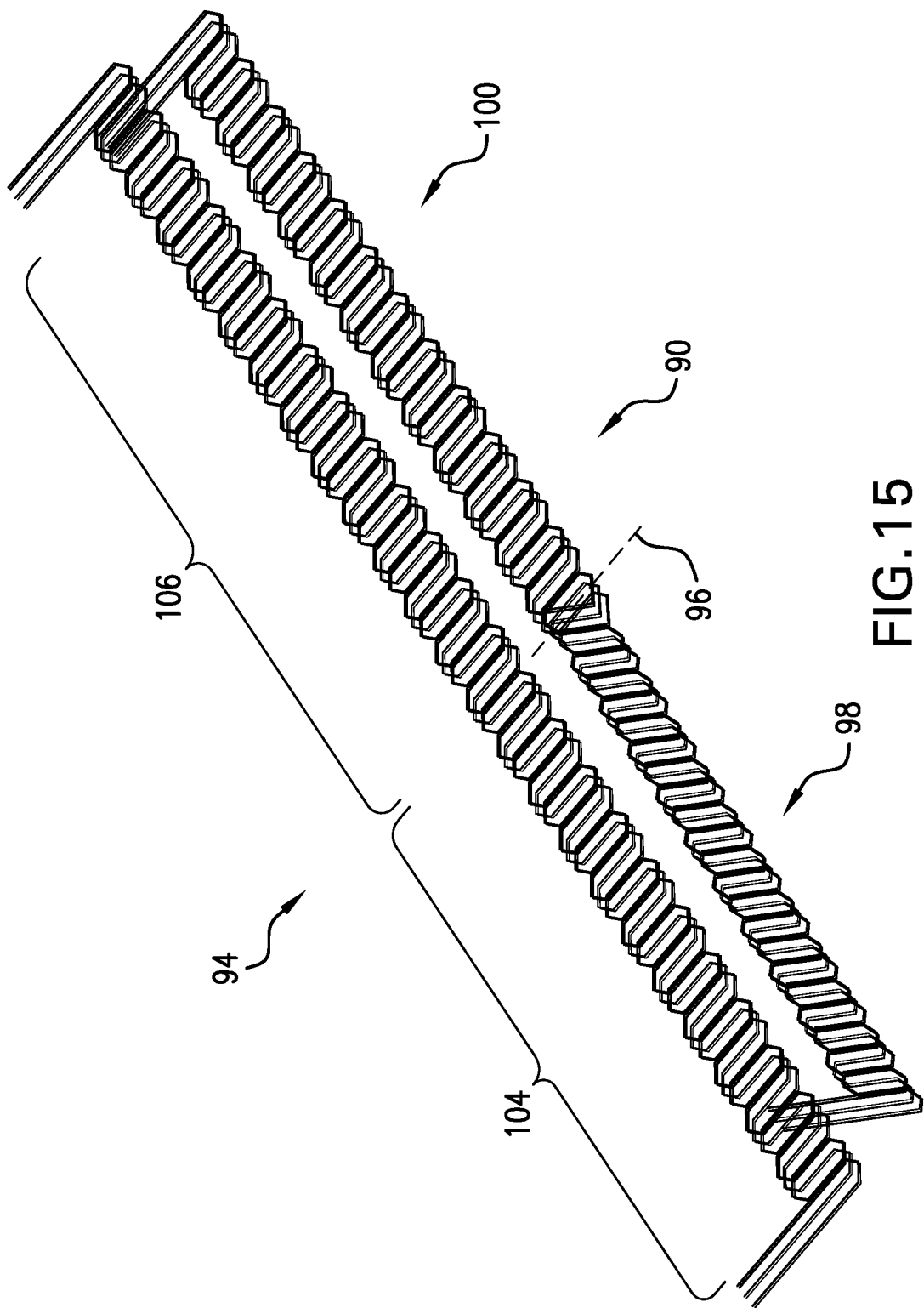
FIG. 15 depicts the second six conductor winding being overlaid onto the first six conductor winding, in accordance with an aspect of an exemplary embodiment.
Figure 16:
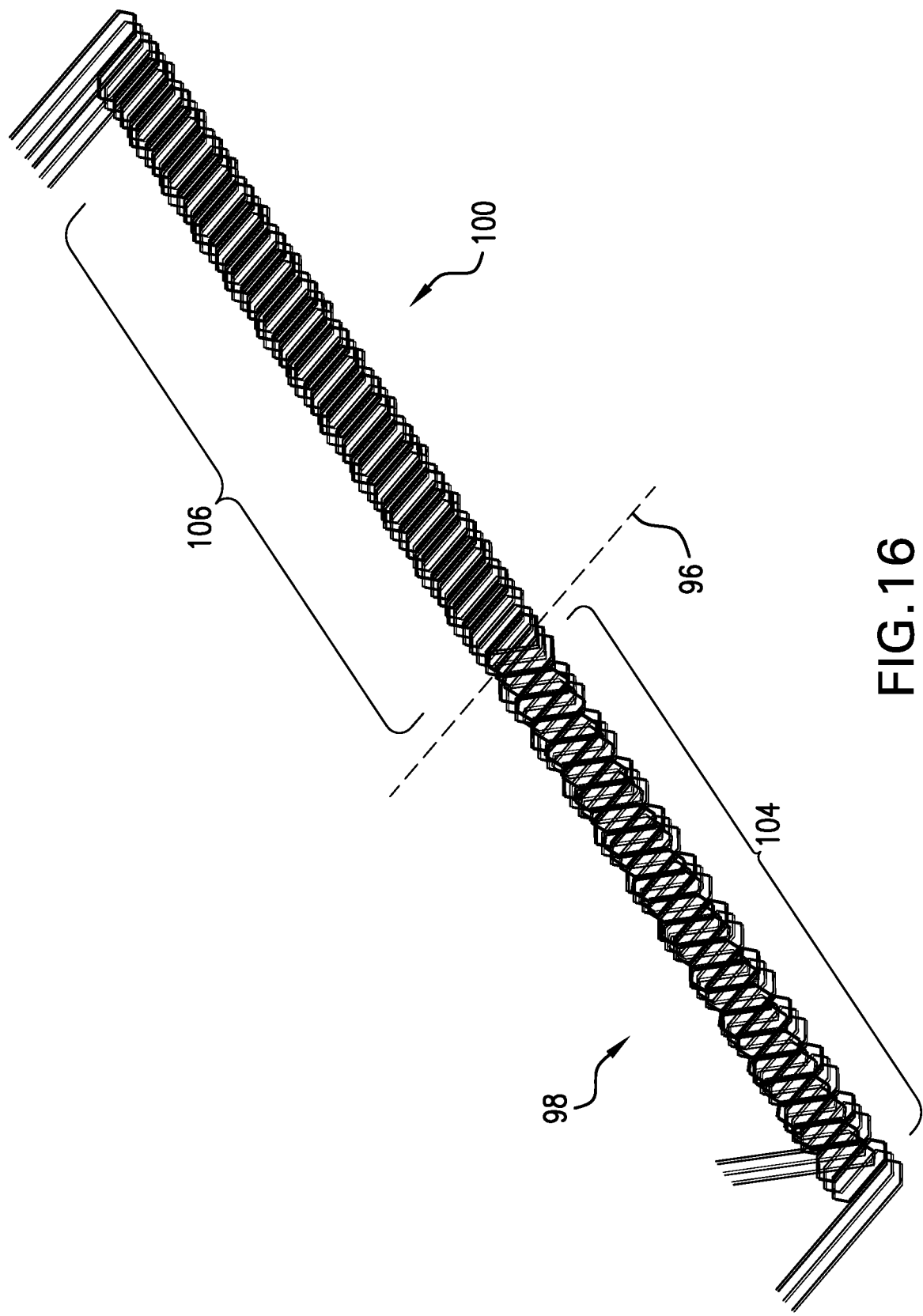
FIG. 16 depicts the portion of the first portion of the first six conductor winding being rotated into the second six conductor winding, in accordance with an aspect of an exemplary embodiment.
Figure 17:
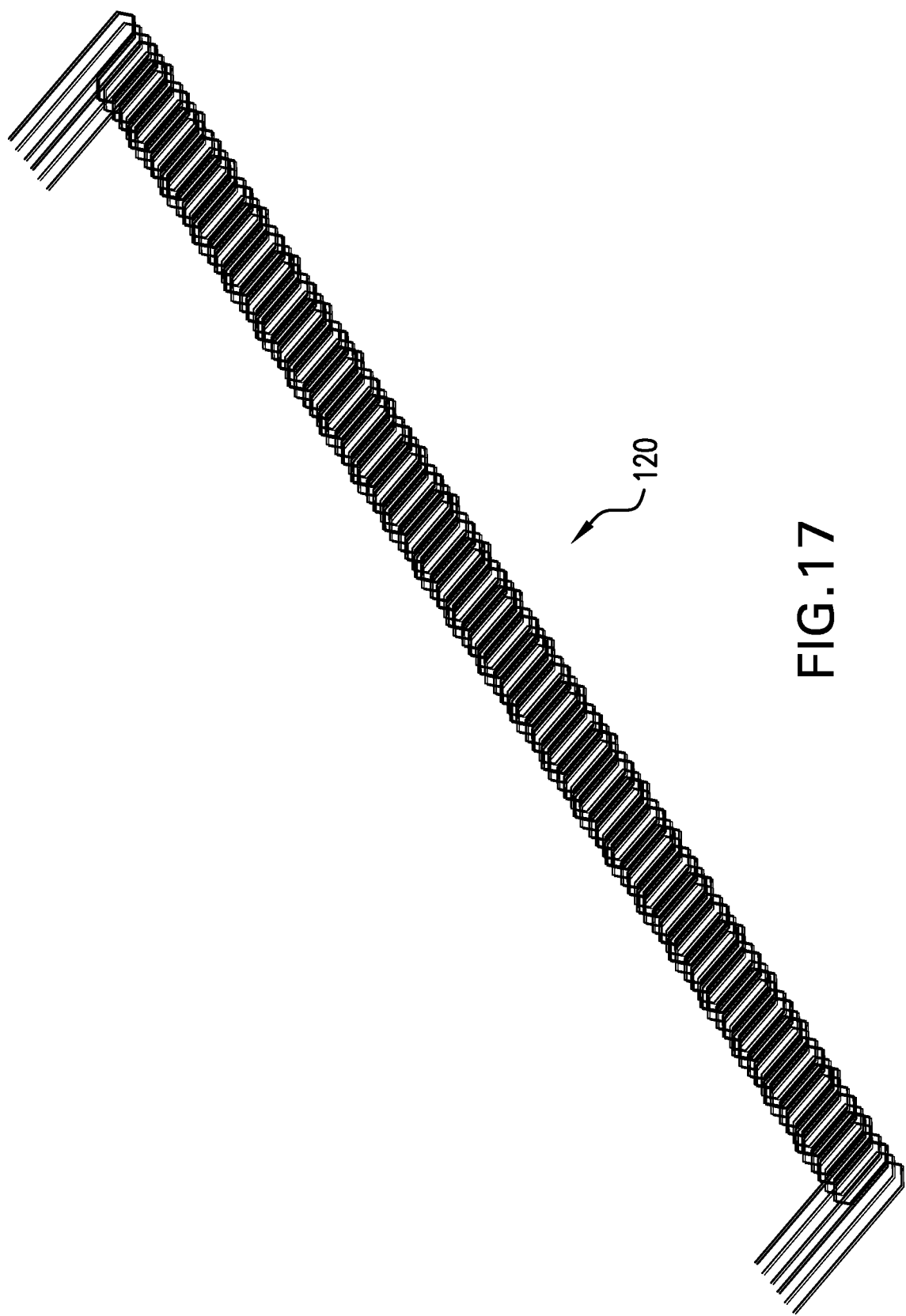
FIG. 17 depicts a woven 12 conductor winding, in accordance with an aspect of an exemplary embodiment.

At this point, as shown in FIG. 13, a second six conductor winding 94 is formed in a manner similar to that of first six conductor winding 90. Second six conductor winding 94 is however formed by overlaying three two conductor pairs of C/D conductors. First six conductor winding 90 may be rotated or bent about an axis 96 as shown in FIG. 14, creating a first section 98 and a second section 100. Second six conductor winding 94 is placed atop first six conductor winding 90 as shown in FIG. 15. FIG. 15 shows the second six conductor winding 94, in process of being placed onto the first six conductor winding 90. Second six conductor winding 94 includes a first portion 104 and a second portion 106. First section 98 may be unfolded as shown in FIG. 16 such that first portion 104 is below first section 98 and second portion 106 is atop second section 100 forming a twelve conductor winding 120 as shown in FIG. 17. Twelve conductor winding 120 may then be loaded into stator body 12 in accordance with an exemplary embodiment.

At this point, it should be understood that exemplary embodiments describe a method for creating the weaving of the A and B wires for a stator having 2 slots per pole per phase and wires having a common pitch winding and special pitch areas. Other arrangements are also possible. Another common winding might be a winding with 3 slots per pole per phase which would have a different common pitch, for example a pitch of 9 and a special sections where an 11 pitch extends over the top of two 8 pitches. It is also understood that more than two special pitch areas (for example 5-7 pitch areas) per pair of wires may be employed in other windings.

A stator having wires housed in a slot in radial rows has slot segment layers. The slot segments housed in the outermost layer are considered to be in layer #1. The slot segments of the wires housed in the second outermost layer are considered to be in layer 2 and so forth for all 8 layers in each slot. Most stators with two slots per pole per phase will have a left slot and a right slot of each pole. For a stator having 2 slots per pole per phase and a 4-8-4 phase belt in each pole will have a left slot a middle slot and a right slot. To reduce recirculating currents which may lead to losses and lower efficiency, parallel conductors, e.g., conductors A, B, C, D are connected in parallel for each phase may have similar average layer positions in the left slot of all of the poles. Also for the middle slots. Also for the right slots. To achieve this balancing other areas (other than 5-7 pitch areas) of the winding may need weaving.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of forming a stator winding comprising:
   forming a first conductor having a first end, a second end, and a first plurality of end turns therebetween, the plurality of end turns having at least a first winding pitch;
   forming a second conductor having a first end portion, a second end portion, and a second plurality of end turns therebetween, the second plurality of end turns having at least the first winding pitch;
   bending a first section of the first conductor at a select one of the first plurality of end turns so as to rotate the first section of the first conductor relative to a second section of the first conductor to form a bent first conductor;
   overlaying the second conductor onto the second section of the bent first conductor; and
   unbending the first section of the bent first conductor at the select one of the first plurality of end turns after the second conductor is overlaid onto the second section of the bent first conductor such that a first portion of the second conductor is below the first section of the first conductor and a second portion of the second conductor is atop the second section of the first conductor forming a first conductor pair.

2. The method of claim 1, further comprising:
   bending a third section of the first conductor at another select one of the first plurality of end turns before overlaying the second conductor to further form the bent first conductor.

3. The method of claim 2, further comprising:
   unbending the third section of the bent first conductor at the another select one of the first plurality of end turns when the second conductor is overlaid onto the second section of the bent first conductor such that the first portion of the second conductor is below the first section of the first conductor and the second portion of the second conductor is atop the second section of the first conductor, and a third portion of the second conductor is below the third section of the first conductor to further form the first conductor pair.

4. The method of claim 2, wherein bending the first section of the first conductor includes bending the first section of the first conductor in a first direction and bending the third section of the first conductor includes bending the third section of the first conductor in the first direction.

5. The method of claim 2, wherein bending the first section of the first conductor includes bending the first section of the first conductor in a first direction and bending the third section of the first conductor includes bending the third section of the first conductor in a second direction.

6. The method of claim 5, wherein bending the first section of the first conductor includes bending the first section of the first conductor in a clockwise direction and bending the third section of the first conductor includes bending the third section of the first conductor in a counterclockwise direction.

7. The method of claim 2, wherein forming the first conductor includes creating a first pitch change end turn including a second winding pitch, a second pitch change end turn including a third winding pitch that is distinct from the first and second winding pitches, and forming the second conductor includes creating a third pitch change end turn including the second winding pitch, and a fourth pitch change end turn including the third winding pitch.

8. The method of claim 7, wherein bending the first section of the first conductor includes bending the first conductor at an end turn adjacent the first pitch change end turn.

9. The method of claim 7, wherein bending the first section of the first conductor includes bending the first conductor at the first pitch change end turn.

10. The method of claim 7, wherein overlaying the second conductor onto the second section of the bent first conductor includes aligning the third pitch change end turn of the second conductor with the first pitch change end turn of the bent first conductor.

11. The method of claim 7, wherein bending the first section of the first conductor includes bending the first section of the first conductor at an end turn adjacent the first pitch change end turn and bending the third section of the first conductor includes bending the third section of the first conductor at the second pitch change end turn.

12. The method of claim 1, further comprising:

forming a second conductor pair similar to the first conductor pair, and a third conductor pair similar to the second conductor pair; and overlaying the second conductor pair onto the first conductor pair, and the third conductor pair onto the second conductor pair forming a first six conductor winding having a first longitudinal axis.

13. The method of claim 12, further comprising: forming a second six conductor winding having a second longitudinal axis.

14. The method of claim 13, further comprising:

bending the first six conductor winding forming a bent first six conductor winding with a first segment and a second segment.

15. The method of claim 14, further comprising:

overlaying the second six conductor winding on the bent first six conductor winding.

16. The method of claim 15, further comprising:

unbending the bent first six conductor winding such that the first segment of the first six conductor winding is on top of the second six conductor winding and the second segment of the first six conductor winding is below the second six conductor winding forming a 12 conductor, substantially electrically balanced motor winding.

17. The method of claim 16, wherein bending the first six conductor winding includes rotating the first segment of the first six conductor winding relative to the second segment of the first six conductor winding at an axis of the first six conductor winding.

* * * * *